United States Patent [19]

Pettit

[11] Patent Number: 5,346,240
[45] Date of Patent: Sep. 13, 1994

[54] FIFTH WHEEL MOUNTING

[76] Inventor: Charles A. Pettit, 7008 Summit Valley Rd., Hesperia, Calif. 92345

[21] Appl. No.: 115,815

[22] Filed: Sep. 3, 1993

[51] Int. Cl.$^5$ ............................................. B60D 1/54
[52] U.S. Cl. .............................. 280/438.1; 280/491.1; 280/901
[58] Field of Search .................. 280/433, 438.1, 491.1, 280/901

[56] References Cited

U.S. PATENT DOCUMENTS

| | | | |
|---|---|---|---|
| 2,981,555 | 4/1961 | Abolins | 280/433 |
| 3,574,363 | 4/1971 | Stephenson | 280/901 |
| 3,791,674 | 2/1974 | Berends | 280/901 |
| 4,540,194 | 9/1985 | Dane | 280/901 |
| 4,570,966 | 2/1986 | Giboney et al. | 280/433 |
| 4,657,274 | 4/1987 | Mann et al. | 280/433 |

Primary Examiner—Brian L. Johnson
Assistant Examiner—Kevin Hurley
Attorney, Agent, or Firm—Allen A. Dicke, Jr.

[57] ABSTRACT

A trunk extends down through an opening in the truck's flat bed. A mounting frame is pivoted in the trunk and swings to an open position where the fifth wheel mounted thereon is exposed. Locks releaseably retain the frame in the open and in the closed positions.

16 Claims, 4 Drawing Sheets

FIFTH WHEEL MOUNTING

FIELD OF THE INVENTION

This invention is directed to a mounting structure for placement in an opening in the bed of a flat bed truck. The mounting frame has a cover on one side which covers the opening in the closed position. The fifth wheel is exposed when the mounting frame is in the open position.

BACKGROUND OF THE INVENTION

Some trucks are most useful when they have flat beds with removable stakes around the edges of the bed. These are useful for carrying various types of loads which may or may not need stakes or railings to hold them in place. Sometimes such trucks are fitted with fifth wheels for the hauling of semi-trailers. The problem is the fifth wheel mounting on the flat bed truck occupies a portion of the truck bed area so that the full bed area cannot be utilized for flat loads. To enhance truck utility, there is need for a fifth wheel mounting which permits the fifth wheel to occupy a raised, above-the-bed active position and a lowered, below-the-bed storage position.

SUMMARY OF THE INVENTION

In order to aid in the understanding of this invention, it can be stated in essentially summary form that it is directed to a fifth wheel mounting which includes a trunk for mounting in an opening in the floor of a flat bed truck. A mounting frame is pivoted in the trunk and swings from a recessed or storage position wherein the frame serves to at least partially fill the trunk opening and to a raised or active position wherein the fifth wheel mounting is positioned for access and is locked in the active position.

It is thus an object and advantage of this invention to provide a fifth wheel mounting which permits the fifth wheel and its mounting to be swung into a recessed position wherein the mounting is even with the truck floor and swung into a raised position where the fifth wheel mounting is accessible and active so that the truck may be used either for hauling a flat bottom load or for hauling a fifth wheel trailer.

It is a further object and advantage of this invention to provide a fifth wheel mounting which permits increased utility of a truck employing the mounting by permitting the fifth wheel to be recessed or in an active position.

It is another object and advantage of this invention to provide a fifth wheel mounting wherein a mounting frame which carries the fifth wheel is pivoted in a trunk by a large pivot and is latched in the active position by means of large latches to provide a fifth wheel mounting of considerable strength when it is in the raised position.

Other objects and advantages of this invention will become apparent from a study of the following portion of the specification, the claims and the attached drawings.

DESCRIPTION OF THE PREFERRED EMBODIMENT

Figure 1:
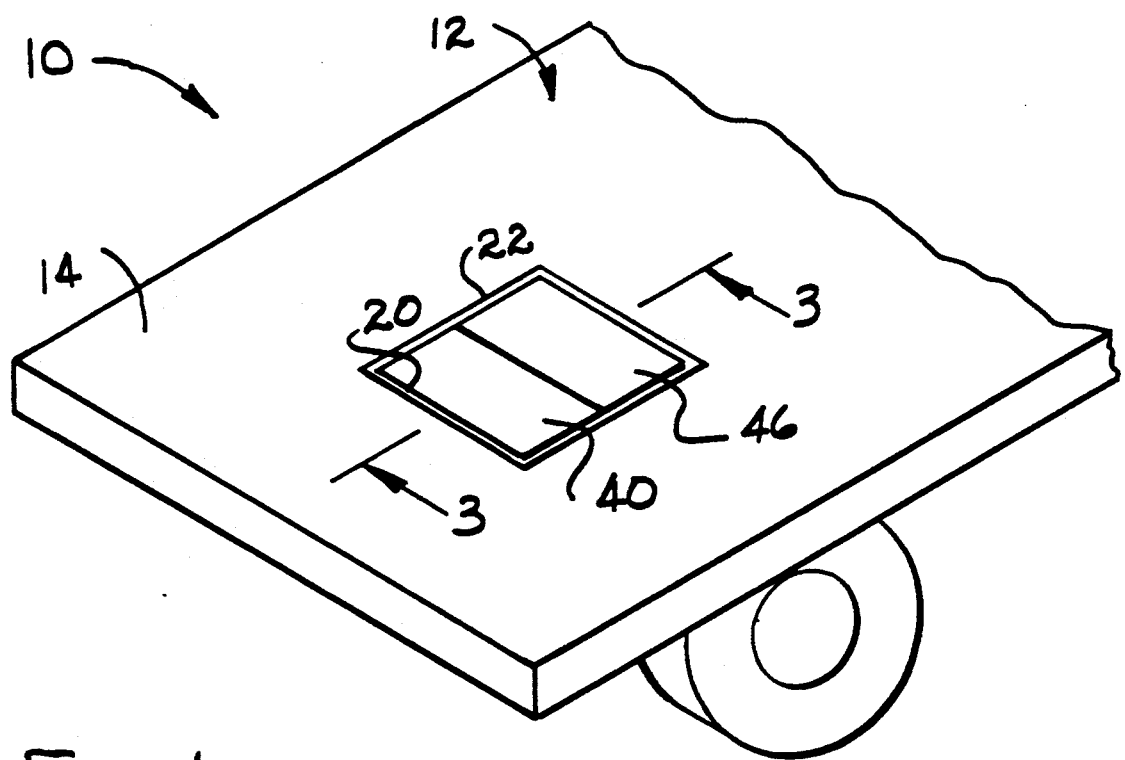
FIG. 1 is a perspective view of a flat bed truck, with the front portion thereof broken away and showing the fifth wheel mounting of this invention in the recessed position.
Figure 2:
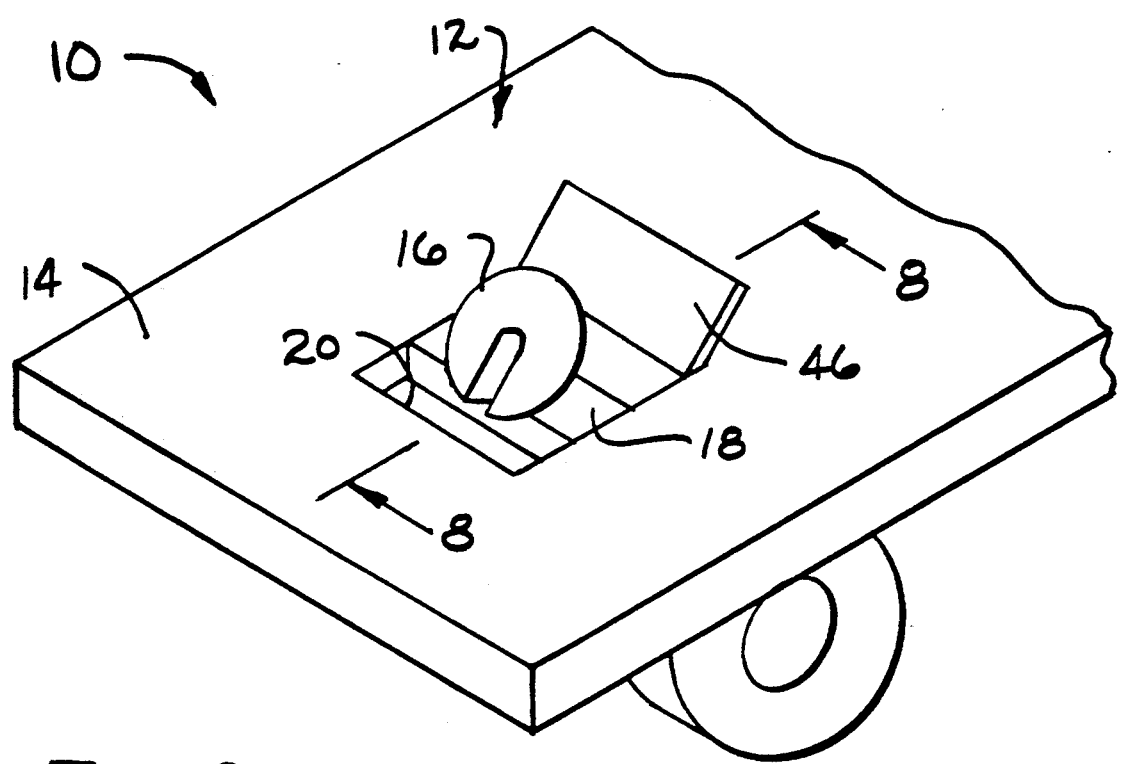
FIG. 2 is similar to FIG. 1, but showing the fifth wheel mounting of this invention in the raised, active position.

FIGS. 1 and 2 show a truck 10 which has a flat bed 12. As in conventional practice, the flat bed 12 has a substantially flat top surface 14 for carrying a load thereon. The bed may have a series of stake pockets around the periphery thereof to receive stakes to secure a load carried on the truck bed. Thus, the truck 10 can be used for carrying loads suitable for a flat bed.

It is also desirable that the truck 10 be able to be suitable for the attachment to the front end of a semi-trailer, carry the load thereof, and act as a tractor for the semi-trailer. To achieve this end, fifth wheel 16 is provided. Mounting 18 permits the fifth wheel 16 to be moved from the recessed, inactive position shown in FIGS. 1 and 3 to the exposed active position shown in FIGS. 2 and 3. That mounting is the subject matter of this invention.

Opening 20 is provided in the flat bed 12, and mounting 18 fits within that opening and is secured to the truck bed. Mounting 18 includes a trunk 22 which has a front wall 24, back wall 26, left wall 28 and right wall 30. These walls are secured together, as by welding. The size of the trunk is such as to fit within the opening. There are means on the trunk for attachment to the truck bed and chassis. For example, a flange may extend outward from one or more of the walls to engage on the truck bed structure below the deck thereof so as to firmly support the trunk. The lower portion of the walls may be secured to the truck chassis. The trunk defines a substantially square opening, as seen in FIGS. 1 and 2.

Figure 3:
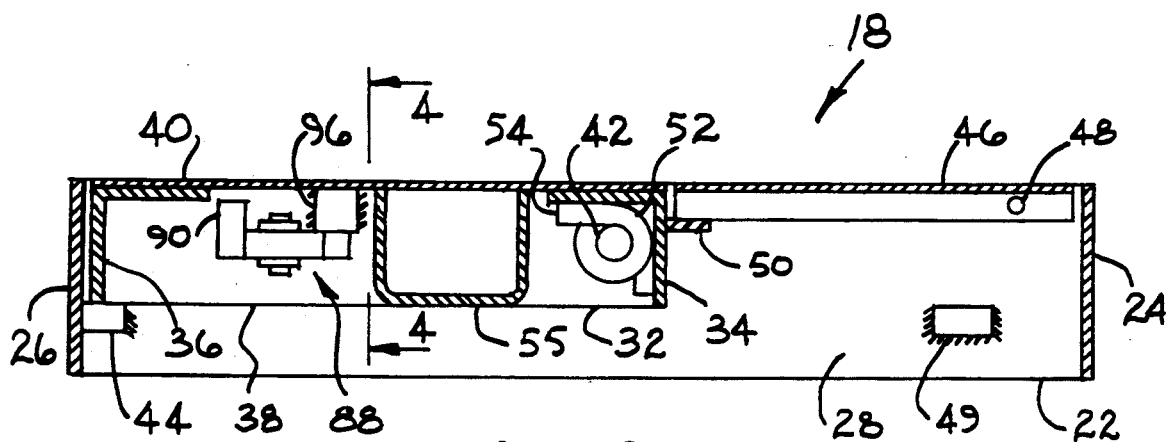
FIG. 3 is an enlarged section taken generally along line 3—3 of FIG. 1, showing the fifth wheel mounting of this invention in the stored, recessed position.
Figure 6:
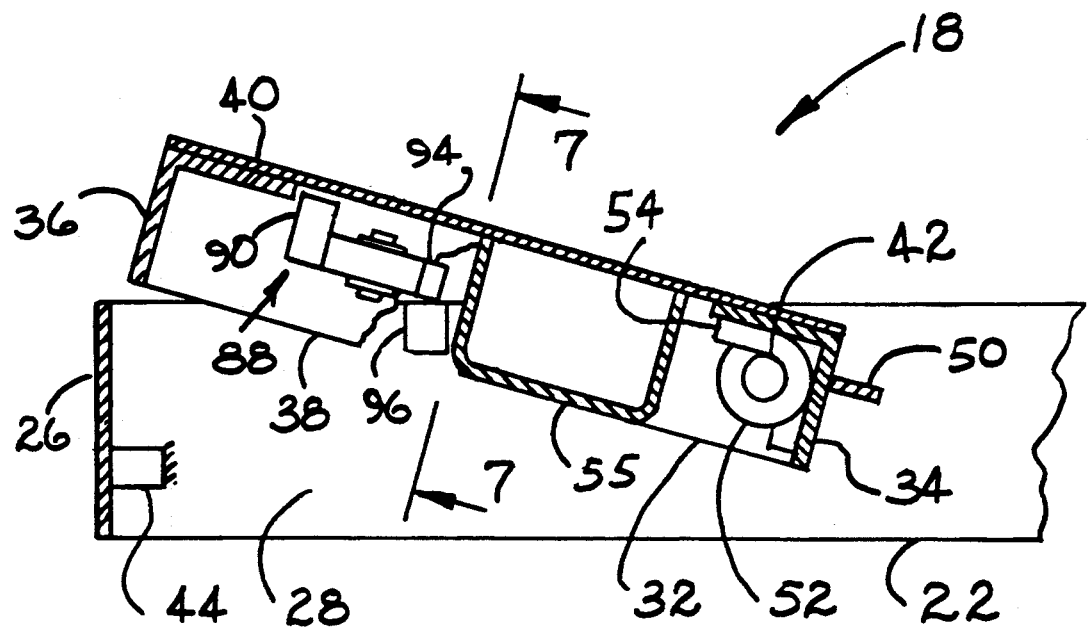
FIG. 6 is similar to FIG. 3, but showing the fifth wheel mounting close to the recessed, stored position.
Figure 8:
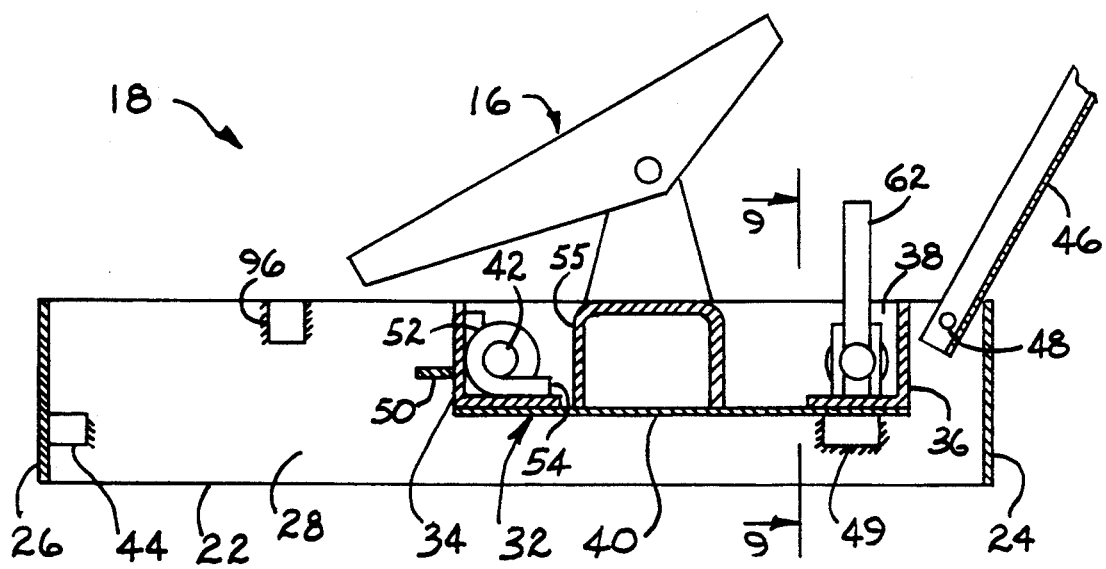
FIG. 8 is a sectional view through the fifth wheel mounting of this invention, similar to FIG. 3, but showing the mounting frame in the raised, accessible position, as seen generally along line 8—8 of FIG. 2.
Figure 9:
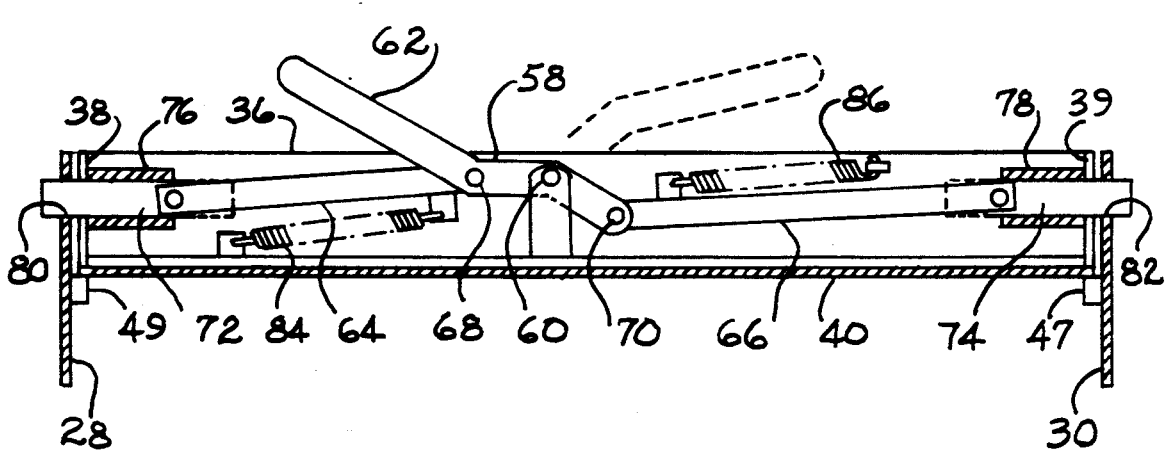
FIG. 9 is an elevational view of the latch mechanism for holding the fifth wheel mounting in the raised, accessible position, as seen generally along line 9—9 of FIG. 8.

Mounting frame 32 is seen in FIGS. 3, 6 and 8. Mounting frame 32 is comprised of two structural angle bars, with the front bar 34 and back bar 36 as well as left flat bar 38 shown in FIGS. 3, 4, 6 and 9. The right flat bar 39 is seen in FIG. 9. Front and back are the positions which the bars occupy when the mounting frame is in its folded, recessed position shown in FIG. 3. These bars are fastened together, as by welding, to define a rectangular structure of considerable strength. Floor plate 40 is secured to the bars, as by welding, and serves as a cover for the frame. Furthermore, the floor plate is in the same plane as the flat bed surface 14 when in the folded, inactive position shown in FIG. 3. The mounting frame 32 is pivotally mounted in the trunk 22 on a large pivot shaft 42. The pivot shaft supports the floor plate at the level of the top surface of the bed. Stop 44, see FIGS. 3, 6 and 8, comprises one of two stops welded in the rear corners of the trunk at a position to support the free end of the mounting frame at the correct level when in the folded position shown in FIG. 3.

Cover plate 46 is supported in the forward portion of the open trunk on pivot pin 48 and on stop 50 attached to the forward side of bar 34, see FIG. 3. When in the closed position, the cover plate 46 covers the forward portion of the trunk opening. Gravity holds the cover plate 46 in place, and when the fifth wheel is desired, the cover plate 46 is first swung forward around its pivot pin 48. A latch 88 detachably retains the mounting frame 32 in the recessed position of FIG. 3. When released, the latch (described below) permits raising of the mounting frame. The mounting frame swings up and to the right around its pivot pin 42 and swings into the space which is opened by the raising of cover plate 46, as seen in FIG. 8. Stop 49, shown in FIGS. 3, 8 and 9, on the wall 28 and a similar stop 47 on wall 30 under the floor plate 40 stop the mounting frame in its open position.

Rotation in this opening direction is assisted by coil spring 52, which is wrapped around pivot shaft 42, see FIGS. 3, 6 and 8. The tail 54 engages inside of front bar 34 and its opposite tail (not shown) is secured to pivot shaft 42. The pivot shaft, in turn, is non-rotatably secured in the trunk. The torsion of coil spring 52 urges the mounting frame from the position shown in FIG. 3 to the position shown in FIG. 6 where it stops against stop 49.

Channel 55 is secured across the mounting frame 32 and is attached as by welding. The top of the channel, as seen in FIG. 8, is level with the top of the trunk. A fifth wheel 16 is mounted thereon by conventional brackets.

It is important that the mounting frame 32 be secure in the open position shown in FIG. 6. This is accomplished by means of the latching mechanism shown in FIG. 9. Unlocking lever 58 is pivoted on pivot pin 60 and carries a manual handle 62 for use in unlatching. Thrust bars 64 and 66 are respectively pivoted on the unlocking lever on pivot pins 68 and 70. The outer ends of the thrust bars are respectively pivoted to latch pins 72 and 74. The latch pins are slidable in guides 76 and 78, which are fixed in the mounting frame. The latch pins extend beyond the mounting frame when in the released position and extend through corresponding latch holes 80 and 82 in the walls 28 and 30, as seen in FIG. 9. Tension springs 84 and 86 are attached between the mounting frame and the thrust bars 64 and 66, respectively, to urge the thrust bars and latch pins into the engaged position shown in FIG. 9. Thus, the mounting frame is securely latched in place.

Figure 7:
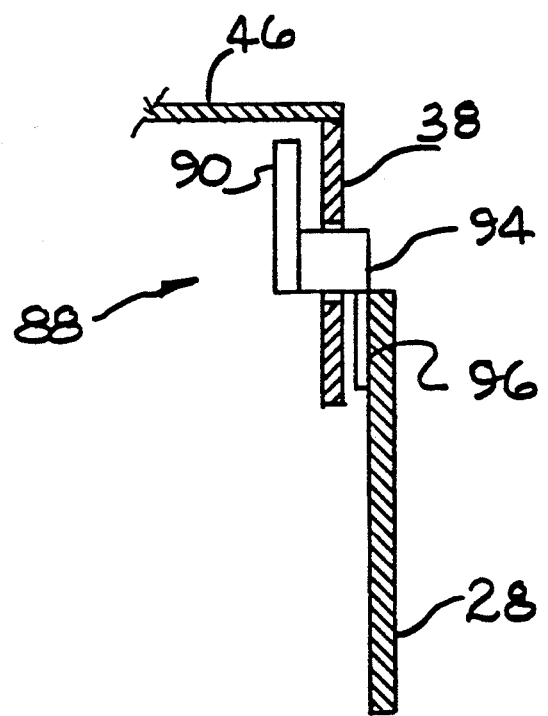
FIG. 7 is an enlarged section taken generally along line 7—7 of FIG. 6, showing the latch preventing the mounting structure from moving into the stored position.

When it is desired that the mounting frame be returned to the position in which the fifth wheel is stored, handle 62 is moved to the right to withdraw the latch pins 72 and 74. The spring 52 is of such torque as to permit the mounting frame to be pivoted in the counterclockwise direction from the position in FIG. 8 to the position in FIG. 6 where the mounting frame assumes a pre-stored position. The pre-stored position of FIG. 6 is reached when latch finger 94 comes to rest on stop 96 (see FIG. 7). The pre-stored position is provided as a safety position to prevent possible injury to the operator should the mounting frame move too rapidly. To place the mounting frame in the stored position of FIG. 3, a hole 100 is provided in top deck plate 40. Latch arm 90 is accessible through the hole (see FIG. 5). Latch arm 90 is then depressed until latch finger 94 clears stop 96. The mounting frame can then be lowered to the stored position shown in FIG. 3.

Figure 4:
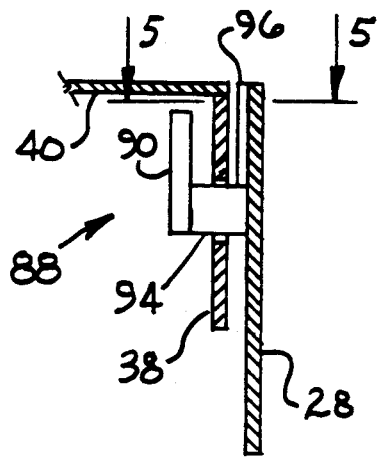
FIG. 4 is an enlarged section taken generally along line 4—4 of FIG. 3, showing the latch detachably retaining the mounting structure in the stored, recessed position.
Figure 5:
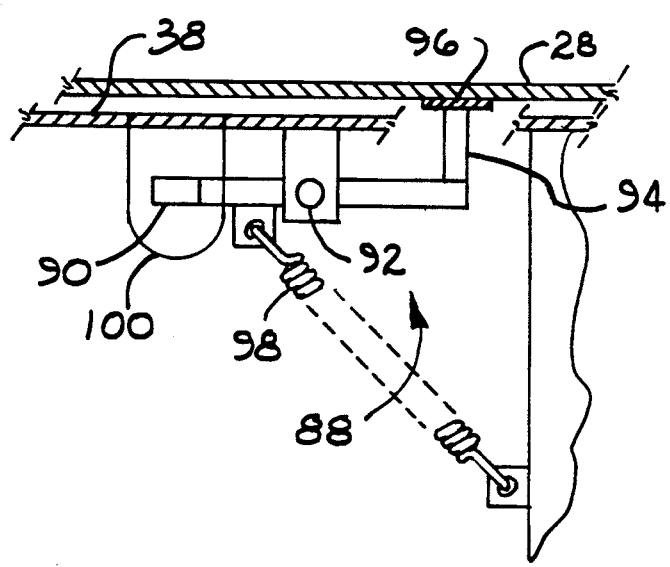
FIG. 5 is a downwardly looking view of the latch mechanism, as seen generally along line 5—5 of FIG. 4.

A mounting frame is detachably retained in this storage position by means of the latch 88, shown in FIGS. 3, 4 and 5. Latch arm 90 is pivoted on mounting frame 32 on latch arm pivot 92. Latch finger 94 is mounted on the end of latch arm 90. Stop 96 is secured on the inside of left wall 28 of the trunk. The latch finger 94 engages under stop 96 when the mounting frame is in its recessed, storage position, as seen in FIG. 4. Tension spring 98 retains the latch finger in latched position until manually released. In this way, the mounting frame remains in the storage position shown in FIGS. 1 and 3 until manually released. Manual release is achieved by access to the latch arm 90 through hole 100, as seen in FIG. 5. Latch arm 90 is then depressed until latch finger 94 clears stop 96. The mounting frame can then be rotated to the raised open position. In this way, the mounting frame is securely latched in either the open or closed position. When the mounting frame is in the closed position, the cover plate 46 is pivoted into the closed position shown in FIG. 3.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A fifth wheel mounting comprising:
   a trunk having at least first and second side walls secured together for mounting in a truck bed having an opening therein, said trunk having a top opening therein;
   a mounting frame positioned within said trunk; and
   a pivot shaft attached to both said first and second side walls of said trunk and extending across said trunk, said mounting frame being pivoted on said pivot shaft, said mounting frame having a floor plate on one side thereof and having fifth wheel mounting means on the other side thereof, said mounting frame being rotatable about said pivot shaft from a first position wherein said floor plate is substantially in line with the top of said first and second side walls to a second position wherein said fifth wheel mounting means is exposed so that said fifth wheel mounting can be placed in an opening in a truck bed to selectively expose said fifth wheel mounting means, said mounting frame being rotatable about said pivot shaft from said second position back to said first position; and
   a manual stop interengaged between said mounting frame and said trunk to stop said mounting frame in its motion between said second position toward said first position to prevent complete closure of said mounting frame to said first position until a latch is manually released whereupon said mounting frame can move to said first position.

2. The fifth wheel mounting of claim 1 wherein a stop in said trunk limits rotation of said mounting frame about said pivot shaft to support said floor plate in its first position.

3. The fifth wheel mounting of claim 2 wherein said latch is mounted to releaseably latch said mounting frame in said first position.

4. The fifth wheel mounting of claim 2 wherein a second latch is mounted to selectively latch said mounting frame in its second position.

5. The fifth wheel mounting of claim 1 wherein said mounting frame covers a portion of said top opening of said trunk when said mounting frame is in its first position and further including a cover plate pivotally mounted on said first and second side walls to substantially cover the remainder of said top opening in said trunk when said mounting frame is in its first position.

6. A fifth wheel mounting comprising:
 a trunk having at least first and second side walls secured together for mounting in a truck bed having an opening therein, said trunk having a top opening therein;
 a mounting frame position within said trunk; and
 a pivot shaft attached to both said first and second side walls of said trunk and extending across said trunk, said mounting frame being pivoted on said pivot shaft, said mounting frame having a floor plate on one side thereof and having fifth wheel mounting means on the other side thereof, said mounting frame being rotatable about said pivot shaft from a first position wherein said floor plate is substantially in line with the top of said first and second side walls to a second position wherein said fifth wheel mounting means is exposed so that said fifth wheel mounting can be placed in an opening in a truck bed to selectively expose said fifth wheel mounting means; and
 a spring engaged between said mounting frame and said trunk to urge said mounting frame toward its second position.

7. A fifth wheel mounting comprising:
 a trunk having at least first and second side walls secured together for mounting in a truck bed having an opening therein, said trunk having a top opening therein;
 a mounting frame positioned within said trunk; and
 a pivot shaft attached to both said first and second side walls of said trunk and extending across said trunk, said mounting frame being pivoted on said pivot shaft, said mounting frame having a floor plate on one side thereof and having fifth wheel mounting means on the other side thereof, said mounting frame being rotatable about said pivot shaft from a first position wherein said floor plate is substantially in line with the top of said first and second side walls to a second position wherein said fifth wheel mounting means is exposed so that said fifth wheel mounting can be placed in an opening in a truck bed to selectively expose said fifth wheel mounting means;
 said trunk being formed of front and back walls as well as left and right side walls and there is a latch mounted on said mounting frame for releaseably retaining said mounting frame in its second position wherein said fifth wheel mounting means is exposed, said latch comprising first and second latch pins which are mounted on said mounting frame and releaseably engage in openings in said side walls of said trunk.

8. The fifth wheel mounting of claim 7 wherein said latch pins are connected to a manual handle so that manipulation of said handle can withdraw said latch pins and further including at least one spring urging said latch pins into side wall engaging position.

9. A fifth wheel mounting comprising:
 walls, including at least left and right side walls secured together to form an upright trunk having a generally open interior, said trunk being for securement in an opening in a truck bed so that the top of said trunk is generally in line with the top of the truck bed;
 a mounting frame within the interior of said trunk, a pivot shaft attached to said side walls of said trunk, said mounting frame being mounted on said pivot shaft for swinging about the axis of said pivot shaft from a first, inactive position to a second, active position, a floor plate on said mounting frame, said floor plate being generally in line with the top of said trunk when said mounting frame is in its first position;
 a spring engaging both said mounting frame and said trunk, said spring being connected to resiliently urge said mounting means from said first position toward said second position;
 fifth wheel mounting means on said mounting frame, said fifth wheel mounting means being exposed at the top of said trunk when said mounting frame is in its second position so that said mounting frame rotates about the axis of said pivot shaft from said first position wherein said mounting means is inaccessible from above said deck to a second position wherein said mounting means is accessible from above said deck.

10. The fifth wheel mounting of claim 9 wherein a latch releaseably retains said mounting means in said first position.

11. The fifth wheel mounting of claim 9 wherein a latch releaseably retains said mounting means in said second position.

12. A fifth wheel mounting comprising:
 walls, including at least left and right side walls secured together to form an upright trunk having a generally open interior, said trunk being for securement in an opening in a truck bed so that the top of said trunk is generally in line with the top of the truck bed;
 a mounting frame within the interior of said trunk, a pivot shaft attached to said side walls of said trunk, said mounting frame being mounted on said pivot shaft for swinging about the axis of said pivot shaft from a first, inactive position to a second, active position, a floor plate on said mounting frame, said floor plate being generally in line with the top of said trunk when said mounting frame is in its first position;
 first and second latch pins movably mounted on said mounting frame and engagement means on said trunk for releasable engagement by said latch pins together with means for manually releasing said latch pins from said engagement means; and
 fifth wheel mounting means on said mounting frame, said fifth wheel mounting means being exposed at the top of said trunk when said mounting frame is in its second position so that said mounting frame rotates about the axis of said pivot shaft from said first position wherein said mounting means is inaccessible from above said deck to a second position wherein said mounting means is accessible from above said deck.

13. The fifth wheel mounting of claim 12 wherein said engagement means comprises openings in said side walls of said trunk and said latch pins engage in said openings when said mounting frame is latched in its second position.

14. The fifth wheel mounting of claim 13 wherein said manual means for controlling said latch pins comprises a handle connected to both said latch pins and a spring to urge said latch pins toward the engaged position.

15. The fifth wheel mounting of claim 14 further including a releasable latch for releaseably latching said mounting frame in its first position.

16. The fifth wheel mounting of claim 15 further including a stop in said trunk to stop said mounting frame in its first position.

* * * * *